United States Patent Office 3,084,134
Patented Apr. 2, 1963

3,084,134
MONOMER RECOVERY FROM BUTADIENE/STY-
RENE LATICES BY LIQUID-LIQUID EXTRAC-
TION
Ernest J. Bailey, Borger, Tex., assignor to Phillips Petro-
leum Company, a corporation of Delaware
No Drawing. Filed May 18, 1959, Ser. No. 813,631
5 Claims. (Cl. 260—29.7)

This invention relates to an improved process for the recovery of unpolymerized monomers from emulsion polymerizates.

For convenience, most of the discussion herein is directed to an improvement in the production of synthetic rubber as made by the polymerization of a major portion of 1,3-butadiene and styrene, although many other rubbery polymers can be made using the method of my invention. The conventional process of producing such rubber involves the polymerization of the desired mixture of monomers, removal of the low boiling butadiene by flashing the latex and removal of unpolymerized styrene by vacuum steam distillation. Removal of unpolymerized styrene is necessary in order to prevent an odor problem.

A difficulty in the process results from the steam distillation step because the required heating causes some prefloc to form. This prefloc causes maintenance problems because the material deposits in the stripper columns and in auxiliary equipment. Furthermore, it is not desirable to subject some latices to any heat.

The following are objects of my invention.

An object of my invention is to provide a new process for monomer recovery from emulsion polymerizates. A further object of my invention is to provide a method for this monomer removal which does not require heating and which, in fact, can be carried out at temperatures below room temperature, temperatures as low as the freezing point of the latex being usable. A further object of my invention is to provide a process for the removal of residual styrene from a latex resulting from the polymerization of butadiene and styrene.

Broadly, my process permits removal of unpolymerized, normally liquid, unsaturated compounds from latices of emulsion polymerizates by contacting the latex with an inert solvent whereby unsaturated compounds are removed by liquid-liquid extraction.

In one specific embodiment and, as applied to the butadiene/styrene copolymer, the invention resides in the process of removing styrene from a latex of a butadiene/styrene emulsion polymerizate comprising contacting the latex with pentane at room temperature, whereby said styrene is removed by liquid-liquid extraction, the contacting with pentane being carried out 1 to 20 times, each time with a volume of pentane 0.5 to 5 times the volume of said latex, separating the latex from the organic phase following each contacting, and separating styrene from the organic phase.

Obviously, the process can be operated using a continuous counter-current contactor. The amount of material used for the extraction is related to the solubility of the monomer in the solvent, the distribution factor, and the required degree of monomer removal. The monomer recovered from the solvent phase is generally recycled to the polymerization zone and the solvent is then suitable for use in subsequent extraction work.

The contacting can be made with a Podbielniak centrifugal liquid-liquid contactor but other liquid-liquid contacting equipment can be employed, the only requirement being that a good contact between the two phases is obtained.

I believe that my invention will find its greatest application wherein the extraction is carried out at low temperatures of the order of 40 to 60° F., although any combination of temperature and pressure can be used as long as substantially liquid phase conditions are maintained. For styrene removal, I prefer to use the light normally liquid hydrocarbons containing 3 to 5 carbon atoms, such as propane, normal butane, isobutane, normal pentane, and isopentane.

The process and the apparatus of the present invention can be used to separate monomers from the latex of the polymer. For example, it may be used to remove nitriles from emulsions obtained in the production of diolefin/nitrile copolymerizates such as butadiene/acrylonitrile copolymers or styrene from diolefin/styrene copolymerizates such as synthetic rubbery like butadiene/styrene copolymers or isoprene and styrene from resinous, modified styrene copolymers. It may also be used to remove unpolymerized styrene or acrylonitrile or homologues thereof from the emulsions obtained in polymerizing said polymerizable olefinic materials in aqueous emulsion.

Since copolymerizable monomers are well known, this specification would be unduly burdened by a complete review of all of them. A representative list is given in "Synthetic Rubber" by Whitby, copyright 1954, on pages 692 to 698. With any particular latex, it is only necessary to select an inert solvent which will not precipitate the polymer, which is a good solvent for the monomers to be removed, and which has low solubility in the latex. In general, hydrocarbons and ethers are good solvents and it is a simple matter to try a particular solvent to see if it will remove a monomer which is present. The particular method of preparing the emulsion polymerizate is not a part of my invention and numerous well-known methods of making such emulsion polymerizate can be used. For example, a diolefin such as butadiene or its homologues and a substance capable of copolymerizing therewith such as acrylonitrile, methacrylonitrile, styrene and its homologues, acrylic and methacrylic acid esters, methyl vinyl ketone, methylvinylpyridine, and the like are emulsified in about double the quantity of water using a suitable emulsifier such as a soap or other surface active material. Polymerization of the resultant emulsion is usually effected at temperatures from below 0° F. to 150° F. and in the presence of a suitable catalyst composition comprising an oxygen liberating material such as hydrogen peroxide, alkali metal or ammonium perborates or persulfates, organic peroxides or hydroperoxides, modifiers, etc.

The polymerization is continued until approximately 70–75 percent of the monomeric compounds are polymerized, the reaction generally being stopped by the addition of a shortstop. The particular percentage conversion is a variable depending upon the nature of the initial materials used and the physical properties desired in the final polymer. In the case of butadiene copolymers, nearly all the unreacted butadiene may be removed simply by flashing the latex to atmospheric or subatmospheric pressure at substantially the polymerization temperature. The latex is then ready for the extraction of unpolymerized mono-olefinic material in accordance with the present invention. In the case of copolymers of higher homologues of butadiene, a smaller portion of the unreacted diolefin will be removed in the flashing operation, and a mixture of diolefin and mono-olefin will be recovered on extraction. With the higher diolefins the flashing step is sometimes omitted completely.

To demonstrate the effectiveness of this invention, a series of runs were made on a latex of synthetic rubber prepared by the polymerization of butadiene and styrene, at 41° F., the conversion being about 70 percent. The recipe for this polymerization was as follows:

| | Parts by weight |
|---|---|
| Butadiene | 75 |
| Styrene | 25 |
| Water | 180 |
| Rosin soap, K salt | 4.5 |
| Tamol N[1] | 0.15 |
| $Na_3PO_4 \cdot 12H_2O$ | 0.80 |
| p-Menthane hydroperoxide | 0.12 |
| $FeSO_4 \cdot 7H_2O$ | 0.20 |
| $K_4P_2O_7$ | 0.30 |
| Tert-dodecyl mercaptan | 0.20 |
| Shortstop[2] | 0.2 |
| BLE[3] | [4]1.25 |

[1] Sodium salt of a naphthalene sulfonic acid condensed with formaldehyde.
[2] 2:1 weight ratio mixture of sodium dimethyldithiocarbamate and sodium polysulfide.
[3] Diphenylamine-acetone reaction product.
[4] Based on rubber.

A series of runs were made on this latex using pentane for the extraction. The results are shown in the following table:

| Run Number | Volume of pentane per volume of latex | Number of times latex was washed | Percent free styrene remaining in latex |
|---|---|---|---|
| 1 | 1 | 1 | 1.72 |
| 2 | 1 | 2 | 1.25 |
| 3 | 1 | 3 | 0.80 |
| 4 | 2 | 1 | 1.01 |
| 5 | 2 | 2 | 0.96 |
| 6 | 2 | 3 | 0.76 |
| 7 | 2 | 10 | 0.33 |

The following examples illustrate operation of my invention as it is used in commercial operation.

*Example I*

Rubber prepared according to the recipe set forth above was made, the conversion being taken to 65 percent. The latex from the final reactor in a polymerization chain was flashed at atmospheric conditions for removal of the butadiene. This flashed latex is then passed to a centrifuge wherein it is extracted with normal pentane and the phases separated. This was repeated five times. In each contacting step, the volume of pentane is equal to the volume of the latex. After this operation, the styrene content of the latex is reduced to a very low level.

*Example II*

When the procedure of Example I is repeated using acrylonitrile in place of the styrene, similar results are obtained. Diethyl ether is used as a solvent for the extraction step with this latex.

As many possible embodiments can be made of this invention without departing from the scope thereof, it is to be understood that all matter herein set forth is to be interpreted as illustrative and not as unduly limiting the invention.

I claim:
1. The process of removing styrene from a latex of a butadiene/styrene emulsion polymerizate comprising contacting the latex following completion of polymerization with pentane at room temperature whereby said styrene is removed by liquid-liquid extraction, and separating the latex from the organic phase.
2. The process of claim 1 wherein a plurality of contact operations are employed.
3. The process of removing styrene from a latex of a butadiene/styrene emulsion polymerizate comprising contacting the latex following completion of polymerization with pentane at room temperature, whereby said styrene is removed by liquid extraction, the contacting with pentane being carried out 1 to 20 times, each time with a volume of pentane 0.5 to 5 times the volume of said latex, separating the latex from the organic phase following each contacting, and separating styrene from the organic phase.
4. The process of removing styrene from a latex of a butadiene/styrene emulsion polymerizate comprising contacting the latex following completion of polymerization with a hydrocarbon selected from the group consisting of propane, butane, and pentane at a temperature within the range of 40° F. to room temperature whereby said styrene is removed by liquid-liquid extraction, and separating the latex from the organic phase.
5. The process of claim 4 wherein said process is carried out at a temperature in the range of 40 to 60° F.

References Cited in the file of this patent

UNITED STATES PATENTS

| 2,391,227 | Clifford | Dec. 18, 1945 |
| 2,507,153 | Gearhart et al. | May 9, 1950 |
| 2,605,242 | Betts | July 29, 1952 |
| 2,685,576 | Fryling et al. | Aug. 3, 1954 |
| 2,691,008 | Grim | Oct. 5, 1954 |

OTHER REFERENCES

Doolittle: The Technology of Solvents and Plasticizers, John Wiley & Sons, Inc. (1954) pages 6–8, New York City.